United States Patent
Omata

(10) Patent No.: US 9,350,896 B2
(45) Date of Patent: May 24, 2016

(54) IMAGE PROCESSING APPARATUS, CONTROL METHOD FOR IMAGE PROCESSING APPARATUS, AND STORAGE MEDIUM

(71) Applicant: CANON KABUSHIKI KAISHA, Tokyo (JP)

(72) Inventor: Jun Omata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/574,582

(22) Filed: Dec. 18, 2014

(65) Prior Publication Data

US 2015/0181073 A1 Jun. 25, 2015

(30) Foreign Application Priority Data

Dec. 20, 2013 (JP) ................................. 2013-263300

(51) Int. Cl.
*H04N 1/04* (2006.01)
*H04N 1/32* (2006.01)
*H04N 1/333* (2006.01)

(52) U.S. Cl.
CPC ......... *H04N 1/32069* (2013.01); *H04N 1/3208* (2013.01); *H04N 1/32096* (2013.01); *H04N 1/32374* (2013.01); *H04N 1/33392* (2013.01); *H04N 2201/0094* (2013.01)

(58) Field of Classification Search
CPC .......... H04N 1/32069; H04N 1/32096; H04N 1/32374; H04N 1/33392
USPC ................................ 358/1.9, 1.15, 1.13, 448
See application file for complete search history.

(56) References Cited

U.S. PATENT DOCUMENTS

2012/0147406 A1* 6/2012 Yamaneki .......... H04N 1/00217
358/1.13
2013/0070295 A1* 3/2013 Maruyama ............... H04N 1/00
358/1.15

FOREIGN PATENT DOCUMENTS

JP 2012-142680 A 7/2012

* cited by examiner

*Primary Examiner* — Houshang Safaipour
(74) *Attorney, Agent, or Firm* — Canon U.S.A., Inc. IP Division

(57) ABSTRACT

An MFP determines, based on a set destination, whether it is necessary to establish a plurality of communications to transmit image data. If it is not necessary to establish the plurality of communications, the MFP executes first transmission control that starts transmission of the image data before the MFP finishes reading all of a plurality of documents. If it is necessary to establish the plurality of communications, the MFP executes second transmission control that starts transmission of the image data after the MFP finishes reading all of the plurality of documents.

18 Claims, 13 Drawing Sheets

FIG. 7A

PLEASE SELECT FUNCTION.

SCAN THEN TRANSMIT ~701

COPY ~702

FIG. 7B

PLEASE ENTER DESTINATION.

E-MAIL  abc@xx| ~703

SELECT FROM ADDRESS BOOK ~704

READING SIZE: A4

COLOR MODE: COLOR

FIG. 7C

SELECT FROM ADDRESS BOOK

| TYPE | NAME |
|------|------|
| FTP | Tanaka |
| SMB | Ito |
| E-MAIL | Kato |

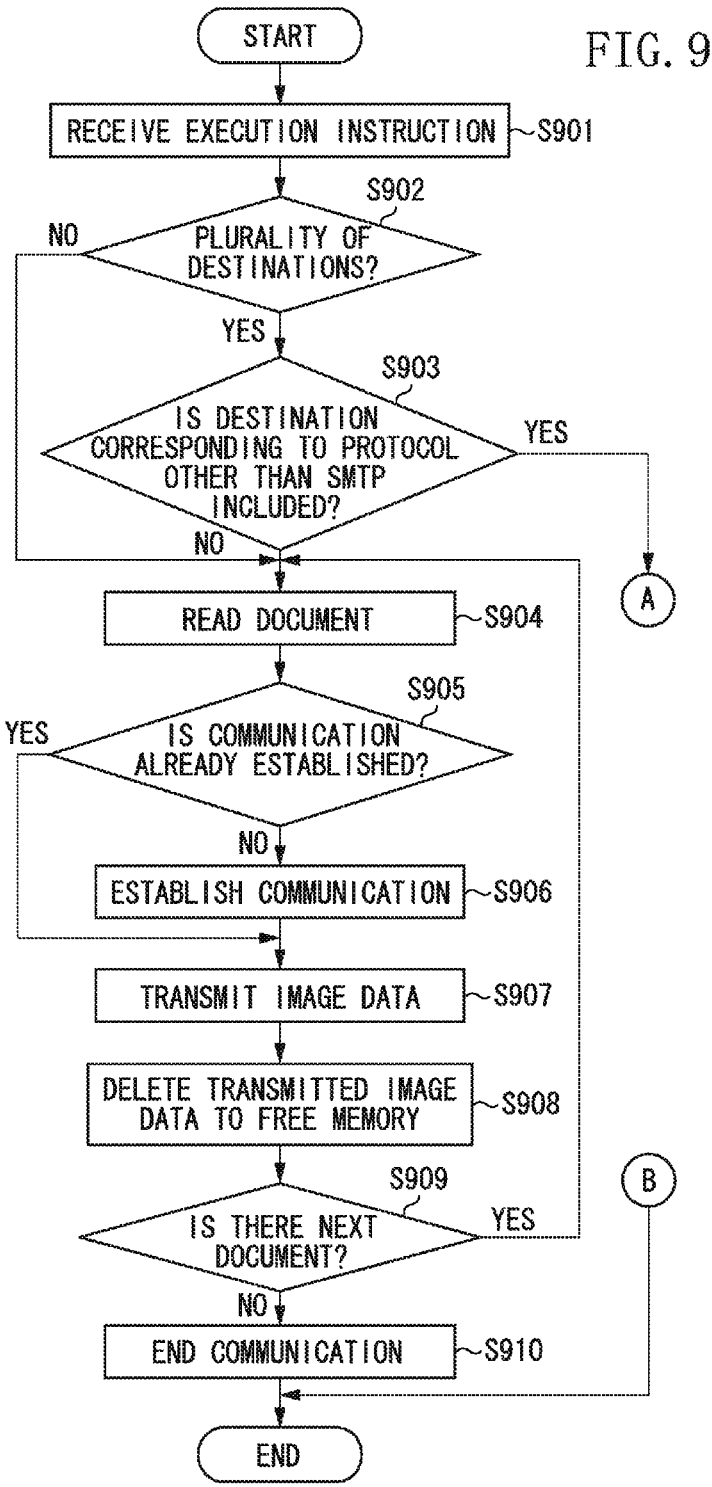

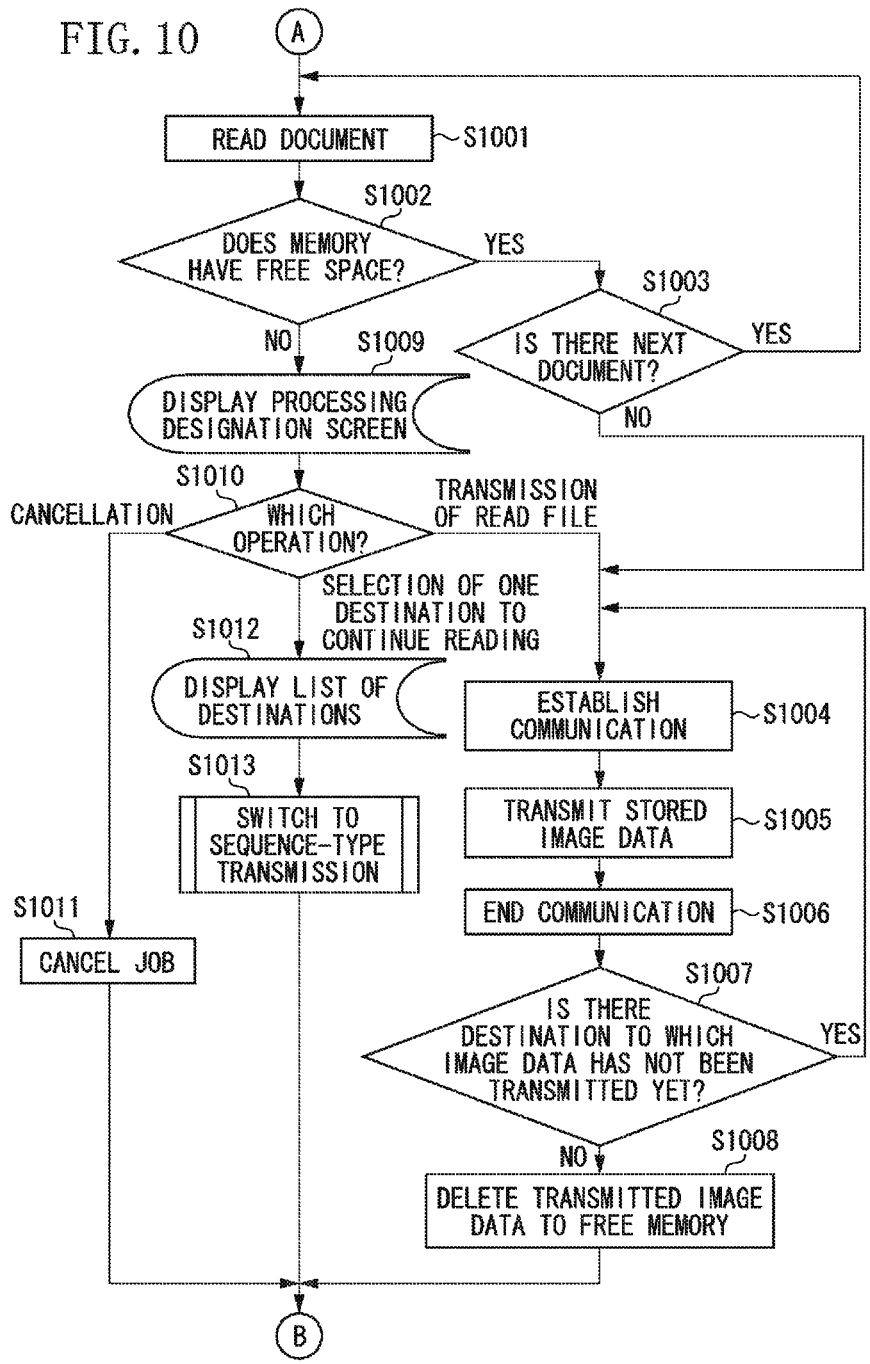

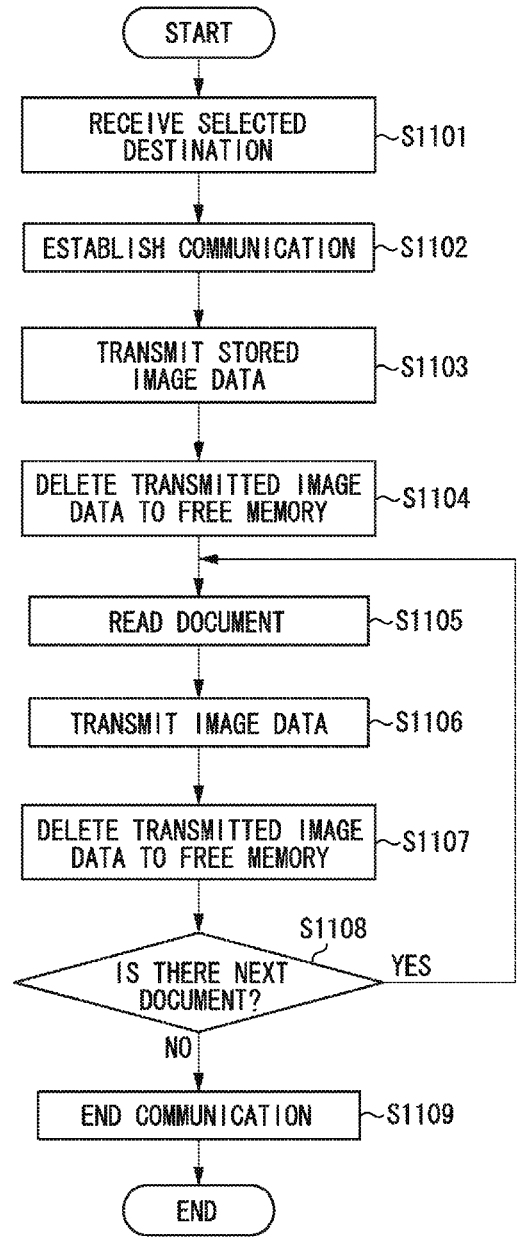

IMAGE PROCESSING APPARATUS, CONTROL METHOD FOR IMAGE PROCESSING APPARATUS, AND STORAGE MEDIUM

BACKGROUND OF THE INVENTION

1. Field of the Invention

The present invention relates to an image processing apparatus transmitting image data, a control method for the image processing apparatus, and a storage medium.

2. Description of the Related Art

Conventionally, image processing apparatuses can transmit image data by using transmission protocols (transmission methods) such as facsimile transmission, electronic mail transmission, and various types of file transmission (e.g., a server message block (SMB), a file transfer protocol (FTP), and a distributed authoring and versioning protocol for the world wide web (WebDAV)). Such an image processing apparatus can not only transmit image data to one destination, but also transmit common image data to a plurality of destinations each corresponding to the same transmission protocol (multi-address transmission). In addition, there is an image processing apparatus capable of transmitting common image data to a plurality of destinations each corresponding to a different transmission protocol (different-type multi-address transmission).

Moreover, conventionally, there is a method by which an image processing apparatus starts to transmit image data after reading a plurality of documents prepared by a user and temporarily storing the image data for all pages of the read documents in a memory (this method is hereinafter called storage-type transmission).

On the other hand, Japanese Patent Application Laid-Open No. 2012-142680 discusses a method for transmitting image data for one page, each time a document for one page is read (this method is hereinafter called sequence-type transmission). The sequence-type transmission is used in an apparatus such as a low-price image processing apparatus for consumer use provided only with a scarce hardware resource (particularly, a memory). In the sequence-type transmission, the transmitted image data is deleted from the memory so that image data of subsequent pages can be stored in the memory. This enables transmission of image data for a plurality of pages even if the memory has a limited space.

When the storage-type transmission is executed, the image data can be repeatedly transmitted as long as the image data is not deleted from the memory. Accordingly, even if the image data is transmitted to a plurality of destinations by using a transmission protocol that needs to establish an individual communication (session) for each destination, the individual communications can be established for the respective destinations, thereby transmitting the image data acquired by one reading processing to the respective destinations. However, in a case where the image data for all of pages cannot be stored due to insufficient space in the memory, the image data cannot be transmitted.

In the sequence-type transmission, on the other hand, even if a memory resource does not have a sufficient space, image data of a plurality of pages can be transmitted without causing the memory space to be full. However, in the sequence-type transmission, image data corresponding to the first page is deleted from the memory by the time image data corresponding to the last page is transmitted. Consequently, when the image data is transmitted to the plurality of destinations by using the transmission protocol which needs to establish an individual communication for each destination, reading processing needs to be performed a plurality of times which causes extra labor.

SUMMARY OF THE INVENTION

The present invention is directed to a configuration for performing appropriate transmission control depending on whether it is necessary to establish a plurality of communications to transmit image data.

According to an aspect of the present invention, an image processing apparatus includes a reading unit configured to read a plurality of documents to generate image data, a setting unit configured to set a destination of the image data, and a transmission control unit configured to execute first transmission control that starts transmission of the image data before the reading unit finishes reading all of the plurality of documents if the image data is transmitted by one communication session to a plurality of destinations set by the setting unit, and to execute second transmission control that starts transmission of the image data after the reading unit finishes reading all of the plurality of documents if the image data is transmitted by a plurality of communication sessions to the plurality of destinations set by the setting unit.

According to another aspect of the present invention, an image processing apparatus includes a reading unit configured to read a plurality of documents to generate image data, a setting unit configured to set a destination of the image data, and a transmission control unit configured to execute first transmission control that starts transmission of the image data before the reading unit finishes reading all of the plurality of documents in a case where the setting unit sets one destination or the setting unit sets a plurality of destinations each corresponding to a predetermined communication method, and to execute second transmission control that starts transmission of the image data after the reading unit finishes reading all of the plurality of documents in a case where the setting unit sets a plurality of destinations and a communication method corresponding to at least one of the plurality of destinations is not the predetermined communication method.

Further features of the present invention will become apparent from the following description of exemplary embodiments with reference to the attached drawings.

BRIEF DESCRIPTION OF THE DRAWINGS

FIGS. 7A, 7B, and 7C are diagrams each illustrating an operation screen of the MFP according to the exemplary embodiment of the present invention.

FIG. 9 is a flowchart illustrating a transmission operation of the MFP according to the exemplary embodiment of the present invention.

FIG. 10 is a flowchart illustrating a transmission operation of the MFP according to the exemplary embodiment of the present invention.

FIG. 11 is a flowchart illustrating a transmission operation of the MFP according to the exemplary embodiment of the present invention.

DESCRIPTION OF THE EMBODIMENTS

Various exemplary embodiments, features, and aspects of the invention will be described in detail below with reference to the drawings.

The following exemplary embodiments are not intended to limit the scope of the claims of the present invention, and all the combinations of the features described in the exemplary embodiments are not always needed as means to be solved by the present invention.

Figure 1:
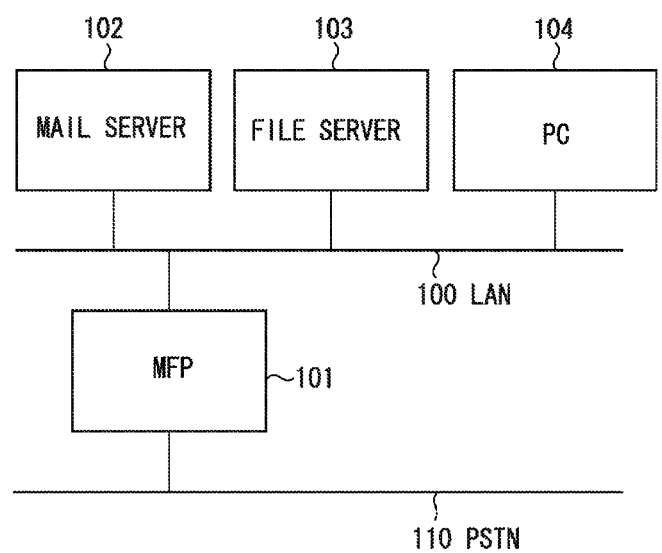
FIG. 1 is an overall view of an image processing system according to an exemplary embodiment of the present invention.

FIG. 1 is an overall view of an image processing system. An MFP 101, a mail server 102, a file server 103, and a PC 104 are communicably connected to one another on a local area network (LAN) 100.

In the present exemplary embodiment, the MFP is described as one example of the image processing apparatus. However, the image processing apparatus may not necessarily be the MFP as long as the image processing apparatus has a function of reading a document and transmitting image data of the document. For example, the image processing apparatus may be a single function scanner. Moreover, the image processing apparatus may be a smart phone, a tablet terminal, or a digital camera, that read a document using a camera function thereof.

The MFP 101 can transmit image data by electronic mail via the mail server 102. The MFP 101 can also transmit a file of image data to a folder serving as a destination, inside the file server 103. In such a case, the MFP 101 uses a protocol such as SMB, FTP, or WebDAV. Moreover, the MFP 101 is connected to public switched telephone networks (PSTN) 110. The MFP 101 can perform facsimile transmission to transmit image data to a facsimile apparatus serving as a destination (not illustrated) via the PSTN 110.

A destination corresponding to each transmission protocol can be registered in an address book that will be described below. Such registration can save a user inconvenience of manually entering a destination for each transmission. For example, the user may operate an operation unit of the MFP 101 to register the destination in the address book. Alternatively, the user may remotely control the MFP 101 using a web browser of the PC 104 to register the destination.

Here, the image processing system includes the MFP 101, the mail server 102, the file server 103, and the PC 104. However, the image processing system may include the MFP 101 and the file server 103 only. Alternatively, the image processing system may include only the MFP 101.

Figure 2:
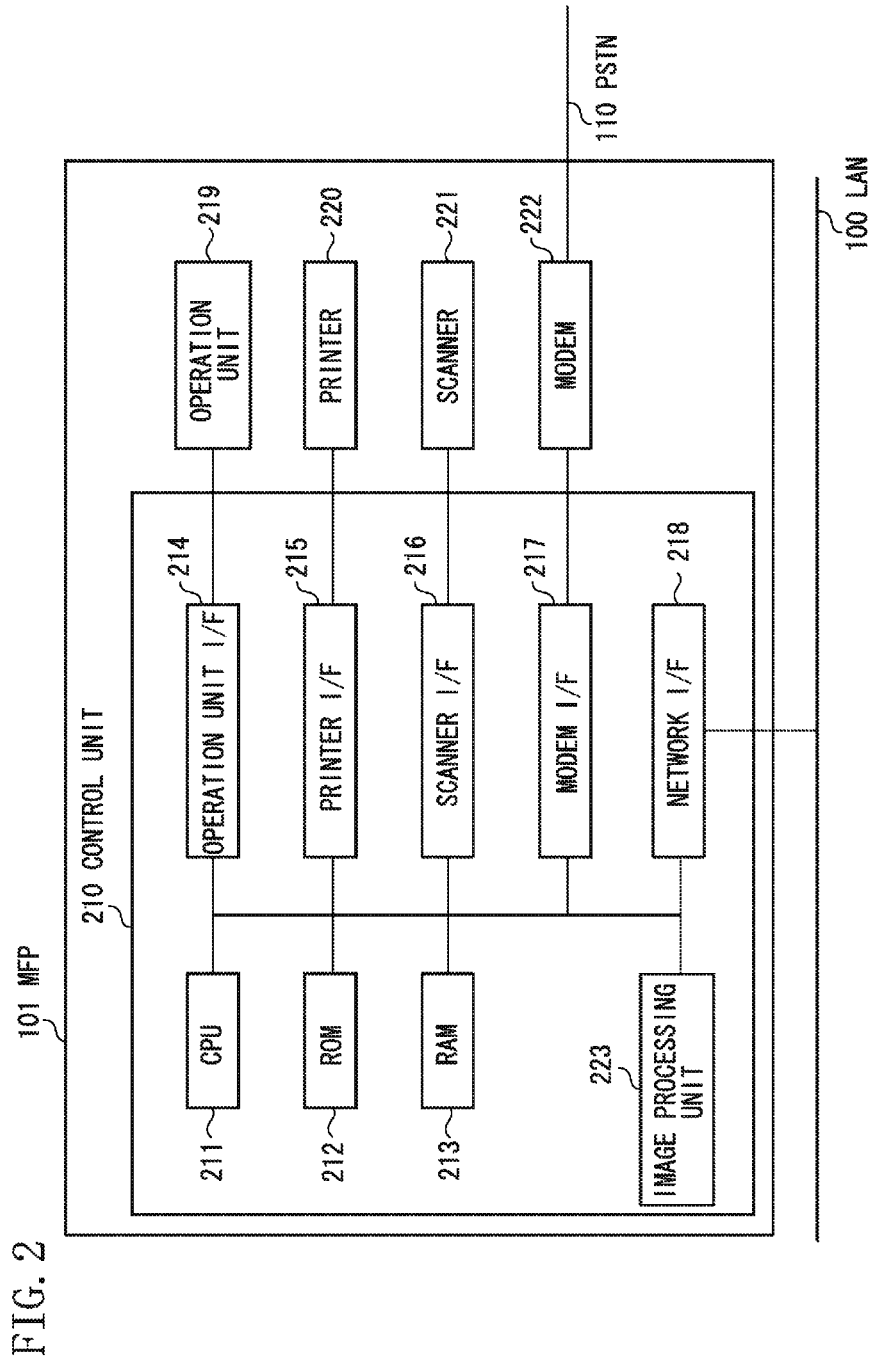
FIG. 2 is a block diagram illustrating a hardware configuration of a multifunctional peripheral (MFP) according the exemplary embodiment of the present invention.

FIG. 2 is a block diagram illustrating a hardware configuration of the MFP 101. A control unit 210 including a central processing unit (CPU) 211 controls the entire operations of the MFP 101. The CPU 211 controls various types of processing such as reading and communication by reading control programs stored in a read only memory (ROM) 212. A random access memory (RAM) 213 is a main storage memory of the CPU 211. The RAM 213 is used as an area in which image data and various control programs are temporarily stored. Moreover, the RAM 213 includes a non-volatile auxiliary storage area to store user's setting information and address book information that will be described below. In the MFP 101, one CPU 211 uses one memory (the RAM 213) to execute each processing to be described below with reference to flowcharts illustrated in FIGS. 9 through 11. Alternatively, for example, the MFP 101 may cause a plurality of CPUs and a plurality of RAMs, ROMs, or hard disk drives (HDDs) to work together to execute each processing to be described with reference to the flowcharts illustrated in FIGS. 9 through 11. Moreover, In the MFP 101, a hardware circuit may execute one part of the processing.

An operation unit interface (I/F) 214 connects an operation unit 219 and the control unit 210. The operation unit 219 functions as a receiving unit that receives an instruction from the user.

A printer I/F 215 connects a printer 220 and the control unit 210. The control unit 210 transfers image data to be printed to the printer 220 via the printer I/F 215 so that the printer 220 prints the image data on a recording medium such as a sheet.

A scanner I/F 216 connects a scanner (a reading unit) 221 and the control unit 210. The scanner 221 reads a document set on the MFP 101 to generate image data (an image file), and transfers the generated image data to the RAM 213 of the control unit 210 via the scanner I/F 216. With various transmission protocols, the MFP 101 can transmit the image data generated by the scanner 221. Moreover, the MFP 101 can transfer the image data generated by the scanner 221 to the printer 220 so that the image data can be printed.

An image processing unit 223 performs image processing on the image data generated by the scanner 221. The image processing will be described below with reference to a flowchart illustrated in FIG. 4. A modem I/F 217 connects a modem 222 and the control unit 210. The modem 222 is connected to the PSTN 110 to execute facsimile transmission by which image data is transmitted to a facsimile apparatus (not illustrated).

A network I/F 218 connects the control unit 210 (the MFP 101) with the LAN 100. The network I/F 218 transmits image data or information to an external device (e.g., the mail server 102, the file server 103, and the PC 104) on the LAN 100. Moreover, the network I/F 218 receives various pieces of information from the external device on the LAN 100.

Figure 3:
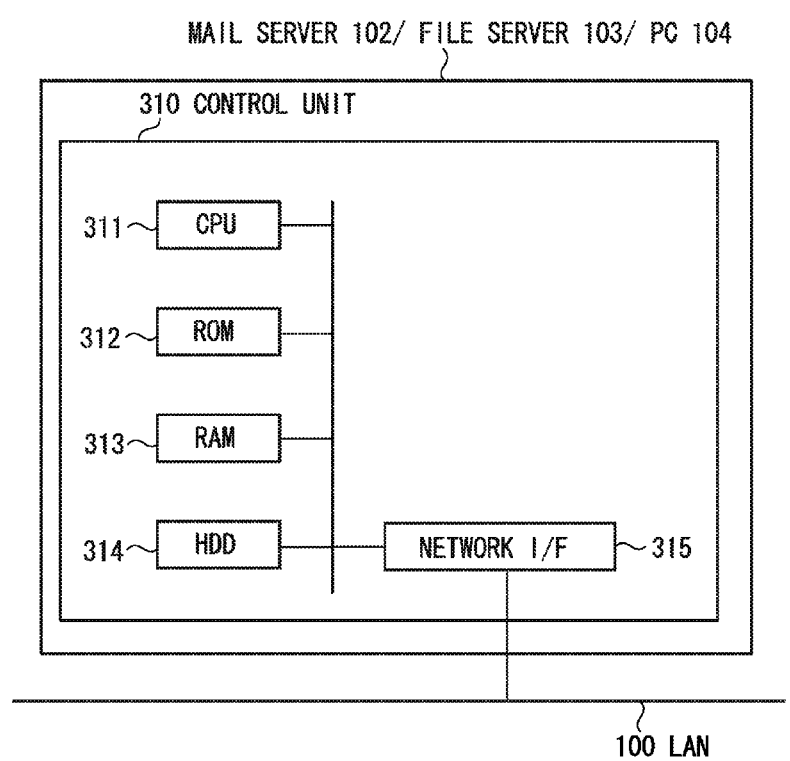
FIG. 3 is a block diagram illustrating a configuration of a mail server, a file server, and a personal computer (PC) according to the exemplary embodiment of the present invention.

FIG. 3 is a block diagram illustrating a configuration of the mail server 102. A control unit 310 including a CPU 311 controls the entire operations of the mail server 102. The CPU 311 controls various operations by reading control programs stored in a ROM 312 or a HDD 314. A RAM 313 is used as a main memory of the CPU 311. The RAM 313 is also used as a temporary storage area, such as a work area, of the CPU 311. The HDD 314 is used as an auxiliary storage area in which various programs and data are stored.

A network I/F 315 connects the control unit 310 (the mail server 102) with the LAN 100. The network I/F 315 transmits and receives various pieces of information to and from other devices on the LAN 100. A configuration of the file server 103 is similar to that of the mail server 102, and thus a description thereof is omitted. A configuration of the PC 104 is also similar to that of the mail server 102. However, the PC 104 further includes a display unit on which an operation screen is displayed, and an operation unit such as a keyboard and a mouse that receives a user operation. The mail server 102 or the file server 103 may include a display unit and an operation unit similar to those of the PC 104.

Figure 4:
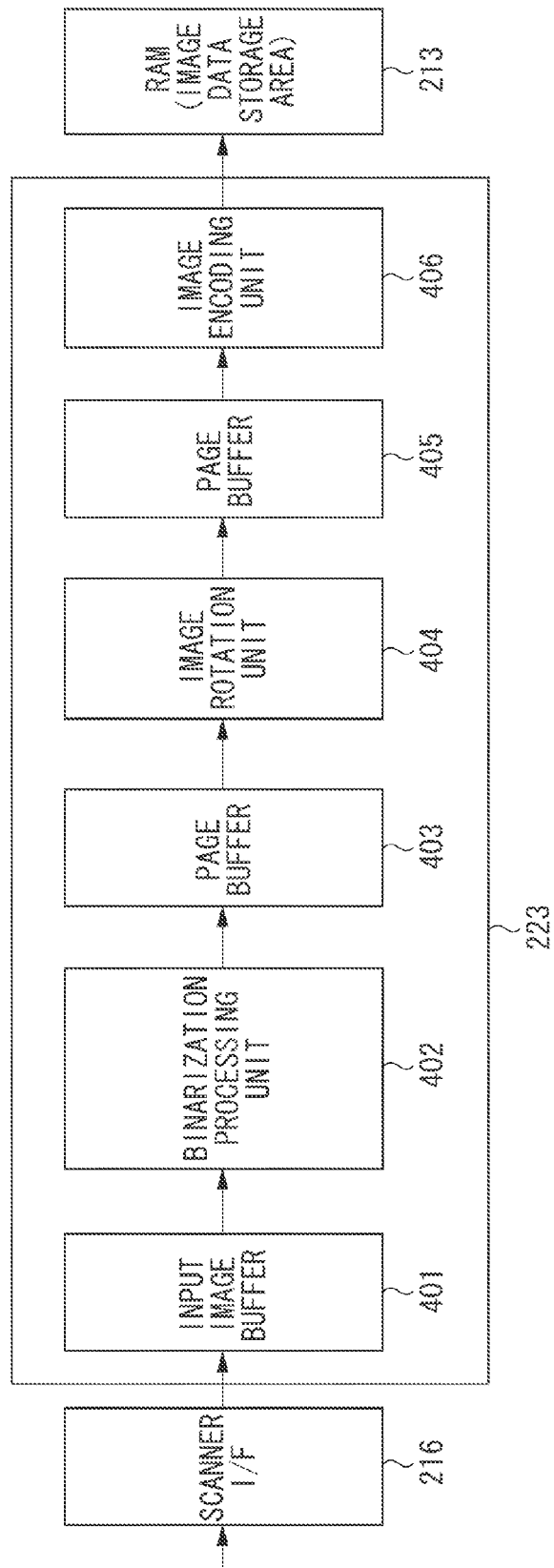
FIG. 4 is a diagram illustrating image processing of an image processing unit according to the exemplary embodiment of the present invention.

FIG. 4 is a schematic diagram illustrating a flowchart of image processing of the image processing unit 223. The image processing unit 223 exchanges data with the RAM 213 through a direct memory access (DMA) controller (not illustrated).

The image data generated by the scanner 221 is once transferred to the RAM 213 via the scanner I/F 216. The image processing unit 223 reads the image data stored in the RAM 213, and stores the image data in an input image buffer 401. Here, if the image is monochrome, the image processing unit 223 treats such monochrome image data as data having 1 byte per pixel. If the image is color, the image processing unit 223 treats such color image data as multivalued (24-bit color) data having 3 bytes per pixel. The image processing unit 223 may treat image data as data having 2 byte per pixel if the image is monochrome, or as multivalued (48-bit color) data having 6 bytes per pixel if the image is color according to resolution of the scanner 221.

The input image buffer 401 does not need to necessarily be able to store image data for one page. The input image buffer 401 needs only an enough space for the image processing to be performed on a processing unit basis. A binarization processing unit 402 reads the multivalued image stored in the input image buffer 401 in a certain amount of data to convert the multivalued image into a binary image, and stores the resultant image in a page buffer 403.

An image rotation unit 404 reads the image data for one page stored in the page buffer 403, and rotates the image. The CPU 211 notifies the image processing unit 223 of an image rotation control setting (e.g., the presence or absence of rotation, a rotation direction, and a rotation angle). After undergoing the image rotation processing, the image is stored in a page buffer 405.

An image encoding unit 406 reads the image data stored in the page buffer 405. If a monochrome mode is set, the image encoding unit 406 encodes the image data using joint bi-level image experts group (JBIG). If a color mode is set, the image encoding unit 406 encodes the image data using joint photographic experts group (JPEG). After encoding the image data, the image encoding unit 406 stores the encoded image data in an image data storage area (memory) of the RAM 213. According to the present exemplary embodiment, the image data storage area is provided inside the RAM 213. However, the image data can be stored in an auxiliary storage device such as an HDD depending on a hardware configuration.

Figure 5:
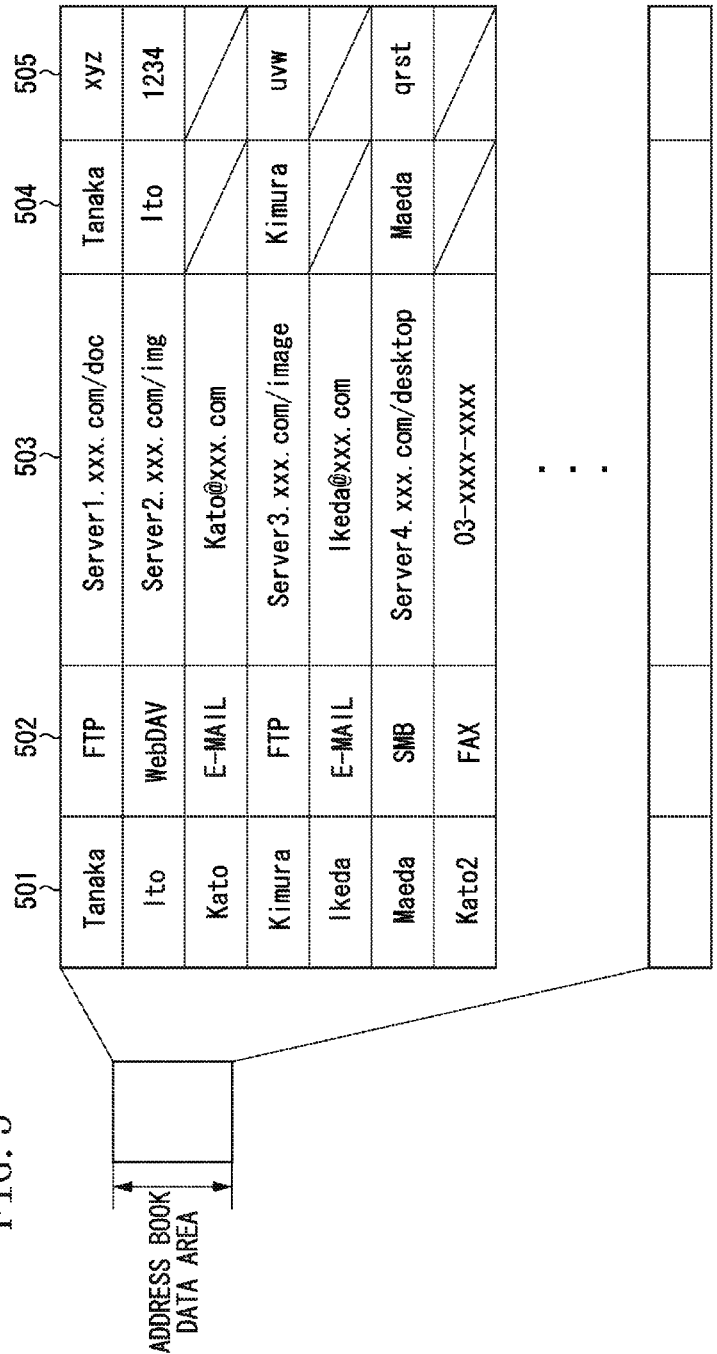
FIG. 5 is a diagram illustrating a structure of address book data according to the exemplary embodiment of the present invention.

FIG. 5 is a schematic diagram illustrating a structure of address book data stored in the RAM 213 of the MFP 101. As illustrated in FIG. 5, data of information 501 through information 505 is stored in an address book data area.

In the information 501, a destination name is stored. The destination name is used when the address book is presented to the user. In the information 502, a type of transmission protocol (communication method) is stored. Here, any of facsimile, SMB, FTP, WebDAV, electronic mail (simple mail transfer protocol (SMTP)) protocols is stored. However, a transmission protocol other than these protocols may be stored.

In the information 503, destination information is stored. If the transmission protocol is SMB, FTP, or WebDAV, a host name of a file server and a folder path are stored as the destination information. If the transmission protocol is electronic mail, an electronic mail address is stored as the destination information. Moreover, if the transmission protocol is facsimile, a telephone number is stored as the destination information. In the example illustrated in FIG. 5, the destination information corresponding to each transmission protocol is stored in the information 503 of the same field. However, the storage of the destination information is not limited thereto. For example, each destination information may be stored in a different field, or a pointer that refers to destination information stored in another area may be stored in the information 503.

Moreover, if the transmission protocol is SMB, FTP, or WebDAV, authentication information (e.g., a user name and a password) is stored in the information 504 and the information 505. The authentication information is necessary to access a folder that is a storage destination of the image data. If the transmission protocol is electronic mail and facsimile, such authentication information is not necessary. Thus, the fields of the information 504 and 505 are not used.

Figure 6:
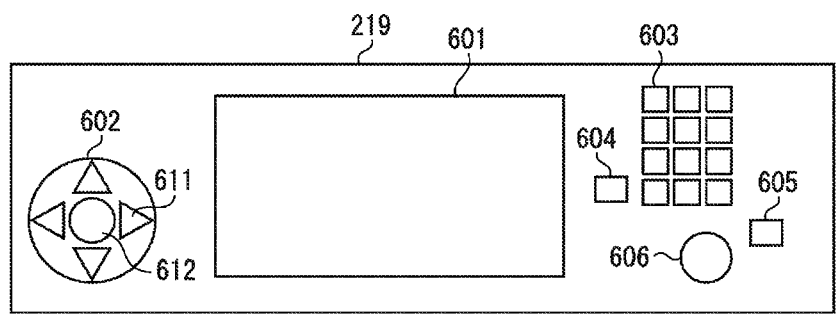
FIG. 6 is an external view illustrating an operation unit of the MFP according to the exemplary embodiment of the present invention.

FIG. 6 is a diagram illustrating one example of the operation unit 219 for receiving an instruction from the user. The operation unit 219 includes a display unit 601, a selection key 602, a numeric keypad 603, a reset key 604, a stop key 605, and a start key 606. In the one example of the operation unit 219 illustrated in FIG. 6 according to the present exemplary embodiment, each of the keys 602 through 606 of the operation unit 219 is described as a hard key. However, if the operation unit 219 has a function of selecting an input from the user, such hard keys may not be necessary. For example, the display unit 601 may have a touch panel function so that one or all of the hard keys can be arranged as soft key(s).

The display unit 601 displays a screen to the user. The selection key 602 includes a scroll key 611 and a determination key 612. The scroll key 611 is arranged so that the user can select one of optional items on the screen displayed on the display unit 601. The determination key 612 is used when the user determines the optional item selected using the scroll key 611. The use of the scroll key 611 and the determination key 612 enables the user to designate one item from the options.

The numeric keypad 603 is used when the user directly enters a numeric value such as the number of copies. The numeric keypad 603 is also used when the user enters single-byte alphanumeric characters to set a destination as described below. The reset key 604 is used for clearing a state in the middle of setting to reset the setting. The start key 606 is used when the user instructs the MFP 101 to start various jobs such as reading a document and copying a document.

FIGS. 7A, 7B, and 7C are diagrams each illustrating an example of an operation screen displayed on the display unit 601. The user operates the selection key 602 illustrated in FIG. 6 to designate a function 701 or a function 702 illustrated in FIG. 7A. In the example screen in FIG. 7A, "SCAN THEN TRANSMIT" is shown as the function 701, and "COPY" as the function 702. However, the MFP 101 may have a function other than these functions.

When the user designates the function 701, the operation screen shifts to a screen for setting a destination and an image reading profile as illustrated in FIG. 7B. The diagram illustrated in FIG. 7B is one example of a screen displayed on the display unit 601 at the time when the user designates the function 701.

When the user designates an area 703 illustrated in FIG. 7B, the screen changes to a mode to receive a new destination from the user. The user uses the numeric keypad 603 to enter the new destination. On the other hand, when the user designates a function 704, an address book screen as illustrated in FIG. 7C is displayed. The address book screen includes contents of the address book data stored in the RAM 213. The address book screen illustrated in FIG. 7C displays destinations for the respective protocols such as facsimile, electronic mail, SMB, FTP, and WebDAV. The user can set one destination or two or more destinations from a plurality of destinations displayed on the address book screen. Here, a destination name and a type (a transmission protocol) are displayed on the address book screen illustrated in FIG. 7C. However, other information may be displayed.

Figure 8A:
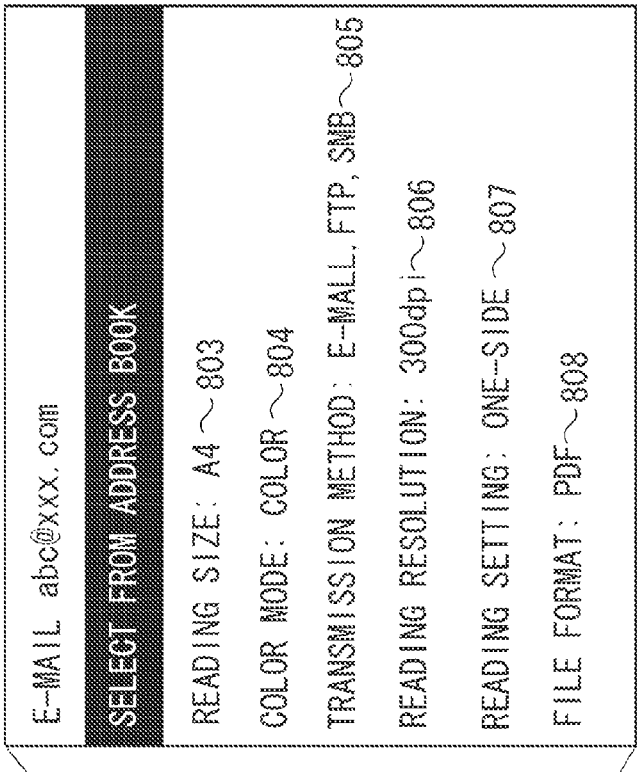
FIGS. 8A and 8B are diagrams each illustrating an operation screen of the MFP according to the exemplary embodiment of the present invention.

When the user completes the setting through the screens illustrated in FIGS. 7A, 7B, and 7C, a transmission screen illustrated in FIG. 8A is displayed. FIG. 8A illustrates one example of the transmission screen displayed at the time when three destinations are set. In FIG. 8A, information 801 is used for notifying the user that when the start key 606 is pressed, the MFP 101 can start to read a document and transmit image data. Moreover, information 802 is used for notifying the user of the number of set destinations. The transmission screen is displayed until the user presses the start key 606. If the start key 606 is not pressed, the transmission screen awaits until an additional destination (multi-address transmission destination) is set by the user.

Figure 8B:
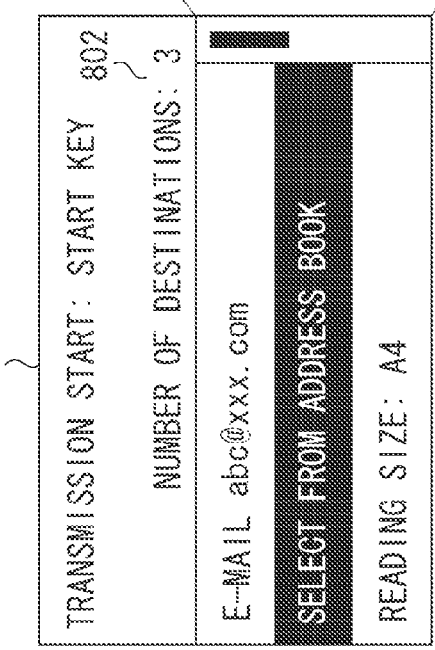

FIG. 8B is a schematic diagram illustrating a list of options displayed on the display unit 601. In practice, the list of options is partially displayed on the display unit 601 by operating the scroll key 611. In FIG. 8B, a function 803 is used for notifying the user of a current setting of document size. The function 803 is used when the user changes the document size setting. A function 804 is used for notifying the user of a current setting of a color/monochrome mode. The function 804 is used when the user changes the color/monochrome mode setting.

In FIG. 8B, a function 805 is used for notifying the user of a current setting of a transmission protocol. Here, since the transmission protocol cannot be changed without changing a destination, the transmission control cannot be changed. The function 805 may include a function of deleting a set destination. In such a case, when the user designates the function 805, a list of set destinations is displayed (not illustrated). The user designates one destination from one or more set destinations displayed on the list, so that transmission of data to the designated destination can be cancelled.

A function 806 is used for notifying the user of a current setting of a reading resolution. The function 806 is used when the user changes the reading resolution setting. A function 807 is used for notifying the user of a current setting of one-sided/two-sided reading. The function 807 is used when the user changes the one-sided/two sided reading setting. A function 808 is used for notifying the user of a current file format setting. The function 808 is used when the user changes the file format setting.

FIGS. 9 through 11 are flowcharts illustrating image data transmission control to be performed in the MFP 101. Each operation (step) of the flowcharts illustrated in FIGS. 9 through 11 is realized by executing a control program stored in the ROM 212 or the RAM 213 by the CPU 211 of the MFP 101.

When the user presses the start key 606 while the transmission screen illustrated in FIG. 8A is being displayed, the CPU 211 starts transmission processing. In step S901, the CPU 211 receives an execution instruction issued by the user pressing the start key 606. Alternatively, in step S901, the CPU 211 may determine whether one or more destinations are set. In such a case, if the CPU 211 determines that one or more destinations are set (YES in step S901), the operation proceeds to step S902. If one or more destinations are not set (NO in step S901), the CPU 211 displays an error message such as "Please set a destination" on the display unit 601, and shifts the screen of the display unit 601 to a screen (FIG. 7B) for setting a destination and an image reading profile.

Subsequently, the CPU 211 determines whether it is necessary to establish a plurality of communications (sessions) to transmit image data to the set destinations. Here, each of the facsimile, SMB, FTP, and WebDAV protocols establishes one communication per destination. That is, in a case where a plurality of destinations for any of these transmission protocols is set, the number of communications to be established needs to be equal to the number of set destinations. On the other hand, the electronic mail (SMTP) serving as a transmission protocol establishes one communication between a client (e.g., the MFP 101) and the mail server 102. This enables transmission of image data to a plurality of destinations. The mail server 102 duplicates a replica of the electronic mail data to which the image data is attached, and distributes the duplicated resultant for each destination. Accordingly, in steps S902 and S903, the CPU 211 needs to determine whether it is necessary to establish the plurality of communications.

In step S902, the CPU 211 determines whether there is a plurality of set destinations. If the CPU 211 determines that there is the plurality of set destinations (YES in step S902), the operation proceeds to step S903. If the CPU 211 determines that the plurality of destinations is not set, that is, one destination is set, (NO in step S902), the operation proceeds to step S904. In step S903, the CPU 211 determines whether the plurality of set destinations includes a destination corresponding to a transmission protocol other than the electronic mail. If the CPU 211 determines that the plurality of set destinations does not include the destination corresponding to the transmission protocol other than the electronic mail (i.e., all of the plurality of set destinations corresponds to the electronic mail) (NO in step S903), the operation proceeds to step S904. If the plurality of set destinations includes the destination corresponding to the transmission protocol other than the electronic mail (YES in step S903), the operation proceeds to step S1001 of the flowchart illustrated in FIG. 10. Here, the electronic mail is the only transmission protocol enabling transmission of the image data to the plurality of destinations with one communication. However, a transmission protocol, other than the electronic mail, that enables transmission of image data to a plurality of destinations with one communication, may be used. In such a case, each of all the destinations corresponds to the same transmission protocol, which can transmit the image data to the plurality of destinations with one communication. Moreover, if a condition that each of all the destinations corresponds to the same transmission protocol is satisfied, the operation proceeds to step S904.

Although the CPU 211 determines whether it is necessary to establish the plurality of communications in steps S902 and S903, the determination are not limited to that in steps S902 and S903. For example, the CPU 211 may first determine whether a set destination or set destinations include a destination corresponding to a transmission protocol other than the electronic mail. If the destination corresponding to a transmission protocol other than the electronic mail is included, the CPU 211 then determines whether the number of set destinations is two or more. If there is no destination corresponding to the transmission protocol other than the electronic mail, the operation proceeds to step S904. If the CPU 211 determines that the number of set destinations is two or more, the operation proceeds to step S1001. On the other hand, if the CPU 211 determines that the number of set destinations is one, the operation proceeds to step S904.

Alternatively, the determination in steps S902 and S903 may be made each time a destination is set through the area 703 or the function 704. In such a case, if the CPU 211 determines that it is necessary to establish a plurality of communications based on the determination made at the time when the destination is set, the operation may proceed to step S1001. If the CPU 211 determines that the plurality of communications is not necessary, the operation may proceed to step S904.

If the CPU 211 determines that it is not necessary to establish the plurality of communications to transmit image data (NO in steps S902 and S903), the operation proceeds to a series of steps from S904 to S910. In steps S904 through S910, the CPU 211 executes sequence-type transmission (first transmission control) that can prevent a memory space from being full. On the other hand, if the CPU 211 determines that it is necessary to establish the plurality of communications to transmit image data (YES in step S903), the operation proceeds to a series of steps from step S1001 through step S1008 as described below. In steps S1001 through S1008, the CPU 211 executes storage-type transmission (second transmission control) that can reduce labor of reading.

In step S904, the CPU 211 controls the scanner 221 to read a document for one page and store image data in the image data storage area (memory) of the RAM 213, the image data having undergone the image processing performed by the image processing unit 223 as described above. Here, if the two-sided reading has been set by the function 807, the CPU 211 controls the scanner 221 to read one side of the document as a first page and store the read image data in the RAM 213. Subsequently, the document is reversed, so that the scanner 221 reads the reversed side as a second page. In a case where the image data storage area of the RAM 213 can store image data for two pages, a scanner capable of simultaneously reading two sides may be used.

In step S905, the CPU 211 determines whether a communication between the MFP 101 and the destination is established. If the CPU 211 determines that the communication is established (YES in step S905), the operation proceeds to step S907. On the other hand, if the CPU 211 determines that the communication is not established (NO in step S905), the operation proceeds to step S906. In step S906, the CPU 211 uses the transmission protocol corresponding to the set destination to establish a communication between the MFP 101 and the destination. If the electric mail (SMTP) is used as the transmission protocol, the CPU 211 establishes a communication between the MFP 101 and the mail server 102 set beforehand.

In step S907, the CPU 211 transmits the image data for one page stored in the RAM 213 to the set destination. In step S908, the CPU 211 deletes the image data transmitted in step S907 (to free the memory area).

In step S909, the CPU 211 determines whether there is a next document. If the CPU 211 determines that there is the next document (YES in step S909), the operation returns to step S904. Then, in the series of steps from S904 to S909, the CPU 211 controls the scanner 221 to read an image, and transmits the image data to the set destination. If the CPU 211 determines that there is no next document (NO in step S909), the operation proceeds to step S910 in which the CPU 211 ends the established communication between the MFP 101 and the destination.

Here, one flowchart has been used, for the sake of simplicity, to describe the operation of reading a document and transmitting image data. However, the document reading and the image data transmitting may be independently executed. For example, in step S904, the CPU 211 may control the scanner 221 to read a document and store the generated image data in the RAM 213 based on a first control program. Meanwhile, the CPU 211 monitors the image data storage area of the RAM 213 based on a second control program. In such a case, when the CPU 211 recognizes that the image data has been stored, the CPU 211 executes steps from S905 to S908. Based on the first control program, the CPU 211 controls the scanner 221 to read a next page when it recognizes that a free space has been generated in the image data storage area (i.e., the transmitted image data has been deleted). In a case where the image data storage area can store image data for two pages, the scanner 221 can start to read a next page without waiting for completion of the image data transmission. In such a case, the CPU 211 can concurrently transmit the image data of Nth page and read a document of Nth+1 page, thereby shortening operation time.

In step S1001, the CPU 211 controls the scanner 221 to read the document and stores the image data in the RAM 213 as similar to the processing in step S904. In step S1002, the CPU 211 determines whether the image data storage area has a free space. If the image data storage area has a sufficient free space to store image data for one page, the CPU 211 determines that the image data storage area has the free space (YES in step S1002), and the operation proceeds to step S1003. If the image data storage area does not have a sufficient free space to store the image data for one page, the CPU 211 determines that the image data storage area does not have the free space (NO in step S1002), and the operation proceeds to step S1009. In step S1009, the CPU 211 waits for an operation from the user as described below. In step S1003, the CPU 211 determines whether there is a next document. If the CPU 211 determines that there is the next document (YES in step S1003), the operation returns to step S1001. If there is no next document (NO in step S1003), the operation proceeds to step S1004.

Since the space necessary to store the image data for one page varies depends on various settings such as a reading size, a color/monochrome mode, and reading resolution, it is calculated based on the image reading setting.

In step S1004, the CPU 211 uses the transmission protocol corresponding to one destination among the plurality of set destinations to establish a communication between the MFP 101 and the destination. In step S1005, the CPU 211 transmits all of the image data stored in the RAM 213 to the set destinations. In step S1006, the CPU 211 ends the established communication between the MFP 101 and the destination. In step S1007, the CPU 211 determines whether there is any destination to which the image data has not been transmitted yet. If the CPU 211 determines that there is a destination to which the image data has not been transmitted yet (YES in step S1007), the operation returns to step S1004 in which the CPU 211 transmits the image data to such a destination. If the CPU 211 determines that there is no destination to which the image data has not been transmitted yet (NO step S1007), the operation proceeds to step S1008. In step S1008, the CPU 211 deletes the transmitted image data (to free the memory area), and ends the transmission operation.

Figure 12B:
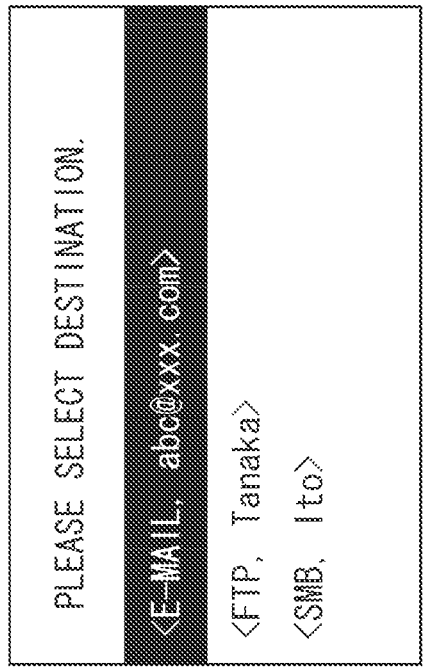
FIGS. 12A and 12B are diagrams each illustrating an operation screen of the MFP according to the exemplary embodiment of the present invention.
Figure 12A:
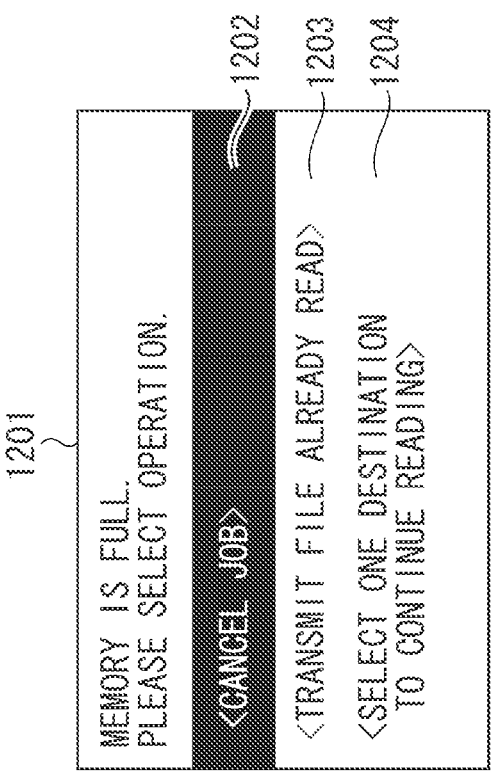

On the other hand, in step S1009, the CPU 211 temporarily stops the image reading to display a screen on the display unit 601. The screen allows the user to designate processing on the display unit 601. FIG. 12A is a diagram illustrating one example of the processing designation screen to be displayed to the user in step S1009. The example screen illustrated in FIG. 12A includes "CANCEL JOB" as a function 1202, "TRANSMIT FILE ALREADY READ" as a function 1203, and "SELECT ONE DESTINATION TO CONTINUE READING" as a function 1204. Moreover, a function 1201 is used for notifying the user that the memory (the image data storage area) is full. When any of the designations of the functions 1202, 1203, and 1204 is received (a receiving means), the operation proceeds to step S1010. In step S1010, the CPU 211 determines which processing has been designated by the user.

If the CPU 211 determines that the function 1202 has been designated by the user (CANCELLATION in step S1010), the operation proceeds to step S1011 for job cancellation. In step S1011, the CPU 211 cancels the document reading that is being temporarily stopped in step S1009, and deletes all of the image data stored in the image data storage area (to free the memory area). Then, the transmission operation ends.

Figure 13B:
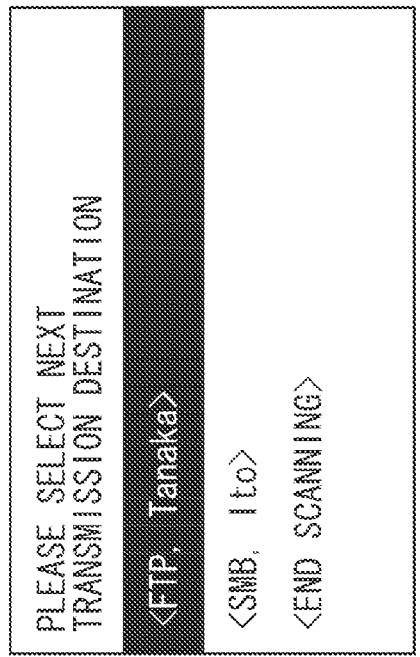
FIGS. 13A and 13B are diagrams each illustrating an operation screen of the MFP according to the exemplary embodiment of the present invention.
Figure 13A:
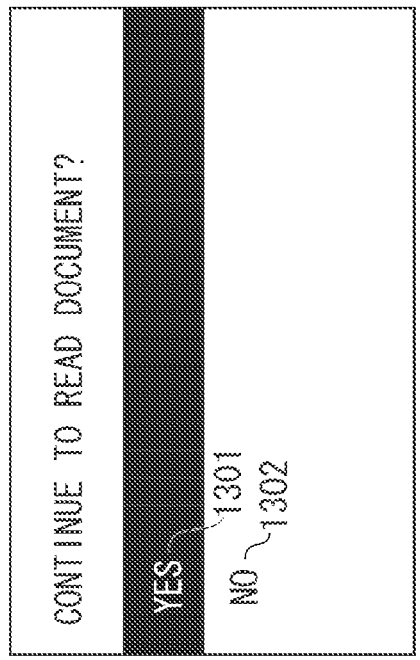

If the CPU 211 determines that the function 1203 has been designated by the user (TRANSMISSION OF READ FILE in step S1010), it is necessary to transmit the stored image data to all of the set destinations. Thus, the operation proceeds to the above-described step S1004, and then in step S1005, the CPU 211 transmits the image data stored in the RAM 213 to all of the set destinations. In this case, the CPU 211 ends the transmission operation after step S1008. However, the CPU 211 may not necessarily end the transmission operation after step S1008. For example, the CPU 211 may execute the following operation. FIG. 13A is a diagram illustrating one example of the screen to be displayed to the user after the operation in step S1008 has been finished. If the user designates a function 1301, the operation returns to step S1001 without changing the destination setting and the reading setting made by the user. In step S1001, the CPU 211 resumes the reading of a next document. Accordingly, the reading of remaining documents can be readily resumed without making the destination setting and the reading setting again. On the other hand, if the user designates a function 1302, the transmission operation ends.

The description returns to the flowchart illustrated in FIG. 10. If the CPU 211 determines that the function 1204 has been designated by the user (SELECTION OF ONE DESTINATION TO CONTINUE READING in step S1010), the operation proceeds to step S1012. In step S1012, the CPU 211 displays, on the display unit 601, a screen for designating one destination to which the image data should be transmitted, among the plurality of set destinations. FIG. 12B is a diagram illustrating one example of the screen displayed in step S1012. On the screen illustrated in FIG. 12B, a list of the plurality of set destinations, which has been set at the time when the start key 606 is pressed, is displayed.

If one destination is designated by the user, the operation proceeds to step S1013. In step S1013, the CPU 211 uses the sequence-type transmission to transmit the image data to one destination designated by the user. The processing in step S1013 is described in detail with reference to the flowchart illustrated in FIG. 11.

In step S1101 of the flowchart illustrated in FIG. 11, the CPU 211 receives a destination designated by the user. In step S1102, the CPU 211 uses the transmission protocol corresponding to the designated destination to establish a communication between the MFP 101 and the destination. In step S1103, the CPU 211 transmits all of the image data stored in the RAM 213. In step S1104, the CPU 211 deletes the transmitted image data (to free the memory area).

Processing in step S1105 through step S1109 of the flowchart illustrated in FIG. 11 is similar to that in step S904 through S910 of the flowchart illustrated in FIG. 9, and thus the description thereof is omitted. However, since the communication between the MFP 101 and the destination has already been established in step S1102, the CPU 211 does not need to perform the processing similar to step S905 and step S906. Moreover, the operation may proceed from step S1104 to step S1105 after all of the image data is deleted, or when a free space for storing image data for one page is generated.

After finishing step S1109, the CPU 211 may display non-designated destinations to the user. For example, if the user designates "ELECTRONIC MAIL, abc@xxx.com" as illustrated in FIG. 12B, the CPU 211 displays the remaining destinations, which have not been designated, on the screen as illustrated in FIG. 13B. This enables the user to readily set the destination, which has not been designated, as a next destination.

As described above, the image processing apparatus according to the present exemplary embodiment can appropriately switch between the storage-type transmission and the sequence-type transmission depending on whether it is necessary to establish a plurality of communications to transmit image data. If it is not necessary to establish the plurality of communications to transmit image data to a destination set by the user, the transmission of the image data is started before all of a plurality of documents is read. This prevents a memory from being full. It is not necessary to establish the plurality of communications to transmit the image data, for example, when there is only one set destination. Moreover, it is not necessary to establish the plurality of communications, for example, when a plurality of destinations is set relative to a predetermined transmission protocol capable of transmitting the image data to the plurality of destinations with one communication. On the other hand, if it is necessary to establish the plurality of communications, the transmission of the image data is started after all of the documents are read. Thus, the image data acquired by one reading processing can be transmitted to each of the destinations, thereby reducing labor in reading processing. It is necessary to establish the plurality of communications, for example, when a plurality of destinations including a destination of the transmission protocol which needs to establish an individual communication for each destination is set.

Accordingly, the present invention is directed to a configuration for performing appropriate transmission control according to whether it is necessary to establish a plurality of communications to transmit image data. Such a configuration can prevent an increase in the number of times of reading even when it is necessary to establish the plurality of communications to transmit image data. Moreover, this configuration can prevent a memory from being full when it is not necessary to establish the plurality of communication to transmit the image data.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-263300 filed Dec. 20, 2013, which is hereby incorporated by reference herein in its entirety.

What is claimed is:

1. An image processing apparatus comprising:
   a reading unit configured to read a plurality of documents to generate image data;
   a setting unit configured to set a destination of the image data; and
   a transmission control unit configured to execute first transmission control that starts transmission of the image data before the reading unit finishes reading all of the plurality of documents in a case where the image data is transmitted by one communication session to a plurality of destinations set by the setting unit, and to execute second transmission control that starts transmission of the image data after the reading unit finishes reading all of the plurality of documents in a case where the image data is transmitted by a plurality of communication sessions to the plurality of destinations set by the setting unit.

2. The image processing apparatus according to claim 1, wherein, in a case where the setting unit sets one destination, the transmission control unit executes the first transmission control.

3. The image processing apparatus according to claim 1, further comprising a determination unit configured to determine that transmission is performed by one communication session in a case where the setting unit sets one destination or a plurality of destinations each corresponding to a predetermined communication method, and to determine that transmission is performed by a plurality of communication sessions in a case where the setting unit sets a plurality of destinations and a communication method corresponding to at least one of the plurality of destinations is not the predetermined communication method.

4. The image processing apparatus according to claim 3, wherein the predetermined communication method is electronic mail.

5. The image processing apparatus according to claim 1, further comprising:
   a determination unit configured to determine whether a memory for storing the image data generated by the reading unit has a free space; and
   a receiving unit configured to receive a designation of processing from a user in a case where the determination unit determines that the memory does not have a free space before the reading unit finishes reading all of the plurality of documents in a case where the second transmission control is executed.

6. The image processing apparatus according to claim 5, wherein, in a case where the receiving unit receives a designation of processing for transmitting image data corresponding to the documents already read to the plurality of destinations set by the setting unit, the image data stored in the memory is transmitted to the plurality of destinations set by the setting unit.

7. The image processing apparatus according to claim 5, wherein, in a case where the receiving unit receives a designation of processing for transmitting image data corresponding to the documents already read to the plurality of destinations set by the setting unit, the image data stored in the memory is deleted after transmitting the image data to the plurality of destination set by the setting unit, and a reading of remaining documents is resumed.

8. The image processing apparatus according to claim 5, wherein, in a case where the receiving unit receives a designation of processing for transmitting image data corresponding to the documents already read to one designated destination among the plurality of destinations set by the setting unit, the image data stored in the memory is deleted after transmitting the image data to the one designated destination, and reading of remaining documents is resumed.

9. The image processing apparatus according to claim 5, further comprising a display unit configured, after image data corresponding to all of documents is transmitted to one designated destination, to display to the user a destination that is not designated, from among the plurality of destinations set by the setting unit.

10. The image processing apparatus according to claim 5, wherein, in a case where the receiving unit receives a designation of processing for cancelling image data transmission, the image data stored in the memory is deleted without transmitting the image data.

11. The image processing apparatus according to claim 1, wherein, in a case where the first transmission control is executed, the image data is transmitted to the destination set by the setting unit each time the reading unit generates the image data for one page.

12. The image processing apparatus according to claim 1, wherein the destination set by the setting unit corresponds to at least one of electronic mail, facsimile, SMB, FTP, and WebDAV.

13. A control method for an image processing apparatus including a reading unit configured to read a plurality of documents to generate image data, the control method comprising:
   receiving a setting of a destination to which the image data is transmitted; and
   executing first transmission control that starts transmission of the image data before the reading unit finishes reading all of the plurality of documents in a case where the transmission is performed by one communication session to a plurality of destinations received by the receiving, and second transmission control that starts transmission of the image data after the reading unit finishes reading all of the plurality of documents in a case where the transmission is performed by a plurality of communication sessions to the plurality of destinations received by the receiving.

14. A non-transitory computer-readable storage medium storing instructions that, when executed by a computer of an image processing apparatus including a reading unit configured to read a plurality of documents to generate image data, cause the computer to perform a method comprising:
   receiving a setting of a destination to which the image data is transmitted; and
   executing first transmission control that starts transmission of the image data before the reading unit finishes reading all of the plurality of documents in a case where the image data is transmitted by one communication session to a plurality of destinations received by the receiving, and second transmission control that starts transmission of the image data after the reading unit finishes reading all of the plurality of documents in a case where the image data is transmitted by a plurality of communication sessions to the plurality of destinations received by the receiving.

15. An image processing apparatus comprising:
a reading unit configured to read a plurality of documents to generate image data;
a setting unit configured to set a destination of the image data; and
a transmission control unit configured to execute first transmission control that starts transmission of the image data before the reading unit finishes reading all of the plurality of documents in a case where the setting unit sets one destination or the setting unit sets a plurality of destinations each corresponding to a predetermined communication method, and to execute second transmission control that starts transmission of the image data after the reading unit finishes reading all of the plurality of documents in a case where the setting unit sets a plurality of destinations and a communication method corresponding to at least one of the plurality of destinations is not the predetermined communication method.

16. The image processing apparatus according to claim 15, wherein the predetermined communication method is electronic mail.

17. A control method for an image processing apparatus including a reading unit configured to read a plurality of documents to generate image data, the control method comprising:
receiving a setting of a destination to which the image data is transmitted; and
executing first transmission control that starts transmission of the image data before the reading unit finishes reading all of the plurality of documents in a case where one destination is received by the receiving or a plurality of destinations each corresponding to a predetermined communication method is received by the receiving, and second transmission control that starts transmission of the image data after the reading unit finishes reading all of the plurality of documents in a case where a plurality of destinations is received by the receiving and a communication method corresponding to at least one of the plurality of destinations is not the predetermined communication method.

18. A non-transitory computer-readable storage medium storing instructions that, when executed by a computer of an image processing apparatus including a reading unit configured to read a plurality of documents to generate image data, cause the computer to perform a method comprising:
receiving a setting of a destination to which the image data is transmitted; and
executing first transmission control that starts transmission of the image data before the reading unit finishes reading all of the plurality of documents in a case where one destination is received by the receiving or a plurality of destinations each corresponding to a predetermined communication method is received by the receiving, and second transmission control that starts transmission of the image data after the reading unit finishes reading all of the plurality of documents in a case where a plurality of destinations is received by the receiving and a communication method corresponding to at least one of the plurality of destinations is not the predetermined communication method.

* * * * *